(12) United States Patent
Suginaka et al.

(10) Patent No.: US 8,204,474 B2
(45) Date of Patent: Jun. 19, 2012

(54) TELEPHONE COMPANY SYSTEM

(76) Inventors: Junko Suginaka, Tokyo (JP); Kunihiko Negishi, Tokyo (JP)

( * ) Notice: Subject to any disclaimer, the term of this patent is extended or adjusted under 35 U.S.C. 154(b) by 285 days.

(21) Appl. No.: 12/448,614

(22) PCT Filed: Dec. 27, 2006

(86) PCT No.: PCT/JP2006/326076
§ 371 (c)(1),
(2), (4) Date: Jun. 26, 2009

(87) PCT Pub. No.: WO2008/081506
PCT Pub. Date: Jul. 10, 2008

(65) Prior Publication Data
US 2010/0069046 A1 Mar. 18, 2010

(51) Int. Cl.
*H04W 4/00* (2009.01)
(52) U.S. Cl. ........ 455/410; 715/706; 715/853; 709/205; 709/227
(58) Field of Classification Search ..... 455/414.1–414.4
See application file for complete search history.

(56) References Cited

U.S. PATENT DOCUMENTS

| 5,864,610 A * | 1/1999 | Ronen | 379/121.01 |
| 7,086,005 B1 * | 8/2006 | Matsuda | 715/706 |
| 2003/0055984 A1 * | 3/2003 | Shimakawa et al. | 709/227 |

FOREIGN PATENT DOCUMENTS

| JP | 2001-154966 A | 6/2001 |
| JP | 2002-259319 A | 9/2002 |
| JP | 2003-033576 A | 2/2003 |

OTHER PUBLICATIONS

International Search Report mailed on Apr. 10, 2007.

* cited by examiner

*Primary Examiner* — Kent Chang
*Assistant Examiner* — Keith Fang
(74) *Attorney, Agent, or Firm* — Rader, Fishman & Grauer PLLC

(57) ABSTRACT

A mobile telephone station is installed in each of a real society and a virtual society arranged on the Internet. A telephone number of a real mobile telephone is associated with a telephone number of a virtual mobile telephone owned by a virtual person corresponding to the owner of the real mobile telephone or the same telephone number is assigned to the telephones so as to link their exchange functions. Thus, it is possible to make a telephone call to both the real society and virtual society without performing a special operation, such as changing telephones in each case, and to use a virtual settlement card issued by a virtual settlement company, and thus this enables performing rich and smooth economic activities in the virtual society.

2 Claims, 4 Drawing Sheets

F I G. 2
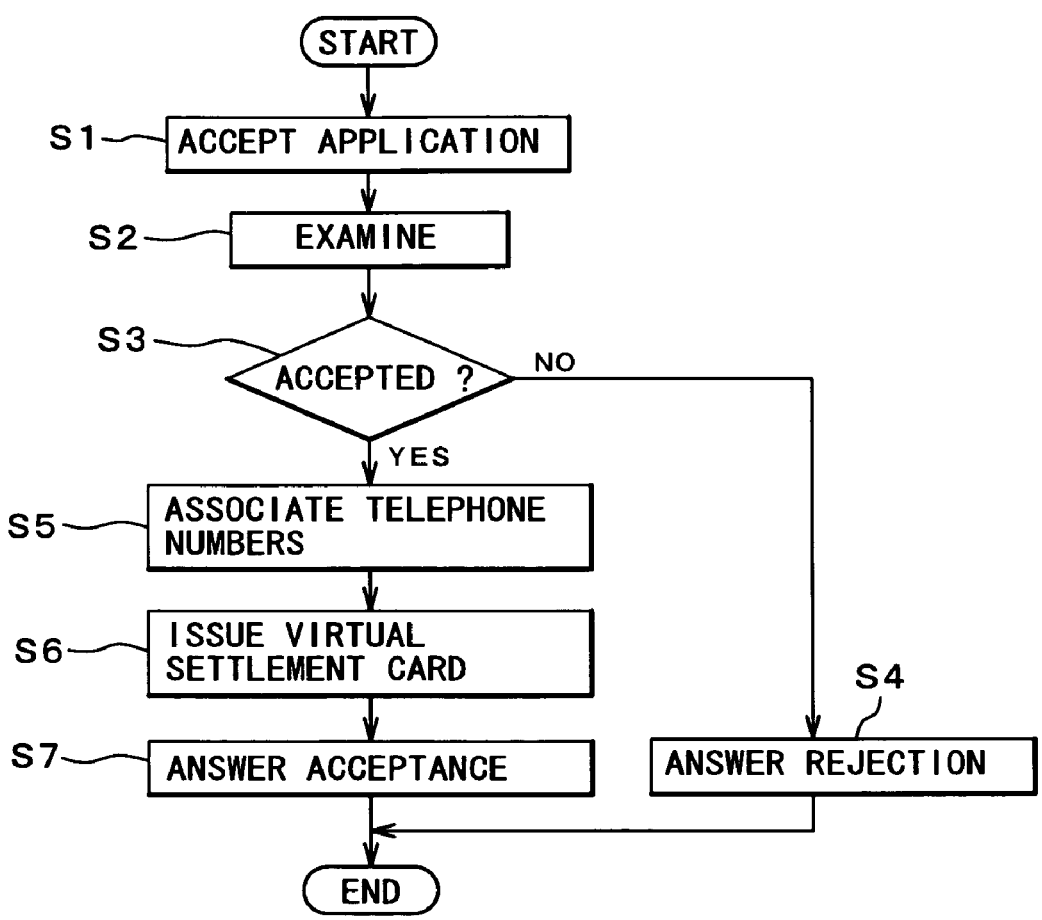

FIG. 3

| CASE NO. | CASE | CALLER'S OPERATION | ACTION |
|---|---|---|---|
| 201 | REAL TELEPHONE → REAL TELEPHONE | CALLING AT NUMBER RTB | CALLING UP ONLY REAL TELEPHONE WITH NUMBER RTB |
| 202 | REAL TELEPHONE → VIRTUAL TELEPHONE | CALLING AT NUMBER VTB | CALLING UP ONLY VIRTUAL TELEPHONE WITH NUMBER VTB |
| 203 | REAL TELEPHONE → REAL TELEPHONE AND VIRTUAL TELEPHONE | CALLING AT NUMBER RTB | CALLING UP REAL TELEPHONE WITH NUMBER RTB AND VIRTUAL TELEPHONE WITH NUMBER VTB, AND CONNECTING ONLY TO ONE THAT HAS RESPONDED FIRST. |
| 204 | VIRTUAL TELEPHONE → REAL TELEPHONE | CALLING AT NUMBER RTB | CALLING UP ONLY REAL TELEPHONE WITH NUMBER RTB |
| 205 | VIRTUAL TELEPHONE → VIRTUAL TELEPHONE | CALLING AT NUMBER VTB | CALLING UP ONLY VIRTUAL TELEPHONE WIYH NUMBER VTB |
| 206 | VIRTUAL TELEPHONE → REAL TELEPHONE AND VIRTUAL TELEPHONE | CALLING AT NUMBER RTB | CALLING UP REAL TELEPHONE WITH NUMBER RTB AND VIRTUAL TELEPHONE WITH NUMBER VTB, AND CONNECTING ONLY TO ONE THAT HAS RESPONDED FIRST. |

FIG. 4

| CASE NO. | CASE | CALLER'S OPERATION | ACTION |
|---|---|---|---|
| 301 | REAL TELEPHONE → REAL TELEPHONE | CALLING AT NUMBER RTB | CALLING UP ONLY REAL TELEPHONE WITH NUMBER RTB |
| 302 | REAL TELEPHONE → VIRTUAL TELEPHONE | CALLING AT NUMERIC CHARACTERS P1 + NUMBER RTB | CALLING UP ONLY VIRTUAL TELEPHONE WITH NUMBER RTB |
| 303 | REAL TELEPHONE → REAL TELEPHONE AND VIRTUAL TELEPHONE | CALLING AT NUMBER RTB | CALLING UP REAL TELEPHONE AND VIRTUAL TELEPHONE WITH NUMBER RTB, AND CONNECTING ONLY TO ONE THAT HAS RESPONDED FIRST. |
| 304 | VIRTUAL TELEPHONE → REAL TELEPHONE | CALLING AT NUMERIC CHARACTERS P2 + NUMBER RTB | CALLING UP ONLY REAL TELEPHONE WITH NUMBER RTB |
| 305 | VIRTUAL TELEPHONE → VIRTUAL TELEPHONE | CALLING AT NUMBER RTB | CALLING UP ONLY VIRTUAL TELEPHONE WITH NUMBER RTB |
| 306 | VIRTUAL TELEPHONE → REAL TELEPHONE AND VIRTUAL TELEPHONE | CALLING AT NUMERIC CHARACTERS P2 + NUMBER RTB | CALLING UP REAL TELEPHONE AND VIRTUAL TELEPHONE WITH NUMBER RTB, AND CONNECTING ONLY TO ONE THAT HAS RESPONDED FIRST. |

TELEPHONE COMPANY SYSTEM

TECHNICAL FIELD

The present invention relates to a telephone company system that is managed in both a real society and a virtual society on the Internet in cooperation.

BACKGROUND ART

There has been known techniques for building a virtual society on the Internet, and by use of which a virtual value is given to a virtual object existing in the virtual society, the virtual value is correlated with reality to provide a sense of reality, and exchange of possessions of clients is enabled on the basis of the virtual values to support economic activities in the virtual society, for operating a virtual society where a conversation activity of clients and activities such as participation in a game and management can be freely performed (refer to Patent Literature 1, for example.)
[Patent Literature 1] JP, 2002-259319, A

SUMMARY OF INVENTION

Technical Problem

However, with these techniques, the activities in a virtual society are limited to simulated experiences within the virtual society, and there is only a point of contact with the real society in exchanging an absolute value virtual object which is the currency in the virtual society agreed upon with an operating company when a client leaves the virtual society for real money at a predetermined exchange rate. Moreover, economic activities in the virtual society do not easily develop, such that the currency in the virtual society cannot exceed a total sum introduced from the real society by conversion due to an agreement between the client and the operating company, and thus the total amount of economic activities is limited by the total sum.

In view of the above-described problems, it is therefore an object of the present invention to provide a telephone company system that associates a telephone number in a real society with a telephone number in a virtual society to thereby smoothly perform economic activities in the virtual society for making the economic activities more likely to develop, and associates the results of economic activities in the virtual society with economic activities of the real society more closely to thereby also further develop economic activities in the real society.

Solution to Problem

In order to achieve the above-mentioned object, a telephone company system according to a first aspect of the present invention comprises: (A.) a real mobile telephone station including (a.) a real telephone number memory for storing a telephone number assigned to a real mobile telephone, and (b.) a real exchange function for performing telephone exchange of the real mobile telephone whose telephone number has been stored in the real telephone number memory; and (B.) a virtual mobile telephone station including (a.) a virtual telephone number memory for storing a virtual telephone number assigned to a virtual mobile telephone in a virtual society on the Internet, (b.) an associating unit for associating memory content of the real telephone number memory and memory content of the virtual telephone number memory with each other, and (c.) a virtual exchange function, using the real mobile telephone and the virtual mobile telephone associated with each other by the associating unit as one mobile telephone, for performing telephone exchange in cooperation with the real exchange function, using either or both of the mobile telephones as a target of call making or call receiving.

Moreover, in a telephone company system according to a second aspect of the present invention, the virtual mobile telephone includes a virtual settlement function, and the virtual telephone station includes a unit for making the virtual settlement function effective if memory content of the real telephone number memory and memory content of the virtual telephone number memory have been associated with each other by the associating unit.

A telephone company system according to a third aspect of the present invention comprises: (A.) a real mobile telephone station including (a.) a real telephone number memory for storing a telephone number assigned to a real mobile telephone, and (b.) a real exchange function for performing telephone exchange of the real mobile telephone whose telephone number has been stored in the real telephone number memory; and (B.) a virtual mobile telephone station including (a.) a virtual telephone number memory for storing a virtual telephone number assigned to a virtual mobile telephone in a virtual society on the Internet, (b.) an associating unit for assigning a telephone number identical to that of the real mobile telephone to the virtual mobile telephone, and (c.) a virtual exchange function, using the real mobile telephone and the virtual mobile telephone assigned with an identical telephone number by the associating unit as one mobile telephone, for performing telephone exchange in cooperation with the real exchange function, using either or both of the mobile telephones as a target of call making or call receiving.

Moreover, in a telephone company system according to a fourth aspect of the present invention, the virtual mobile telephone includes a virtual settlement function, and the virtual telephone station includes a unit for making the virtual settlement function effective if a telephone number identical to a telephone number stored in the virtual telephone number memory has been stored in the real telephone number memory under the name of an identical person.

Advantageous Effects of Invention

The telephone company system according to the first aspect of the present invention, by associating a telephone number of a real mobile telephone with a telephone number of a virtual mobile telephone owned by a virtual person corresponding to an owner of the real mobile telephone, allows making a telephone call to both the real society and virtual society without performing a special operation, such as changing telephones in each case, and thus this enables performing richer and smoother economic activities in the virtual society.

Moreover, the telephone company system according to the second aspect of the present invention allows making a telephone call to both the real society and virtual society without performing a special operation, such as changing telephones in each case, and allows using a virtual settlement card issued by a virtual settlement company to obtain a necessary amount of money, and thus this enables performing richer and smoother economic activities in the virtual society.

Moreover, the telephone company system according to the third aspect of the present invention allows providing a telephone number of a real mobile telephone and a telephone number of a virtual mobile telephone owned by a virtual person corresponding to an owner of the real mobile telephone as identical numbers, which thus allows making a telephone call to both the real society and virtual society by a simple operation without changing telephones in each case, and thus this enables performing richer and smoother economic activities in the virtual society.

Moreover, the telephone company system according to the fourth aspect of the present invention allows making a telephone call to both the real society and virtual society by a simple operation without changing telephones in each case, and allows using a virtual settlement card issued by a virtual settlement company to obtain a necessary amount of money, and thus this enables performing richer and smoother economic activities in the virtual society.

BRIEF DESCRIPTION OF DRAWINGS

FIG. 2 is a flowchart explaining association of telephone numbers and a procedure for issuing a settlement card.

FIG. 3 is an example of an action table included in a real exchange function, a virtual exchange function.

FIG. 4 is another example of an action table included in a real exchange function, a virtual exchange function.

REFERENCE SIGNS LIST

Figure 1:
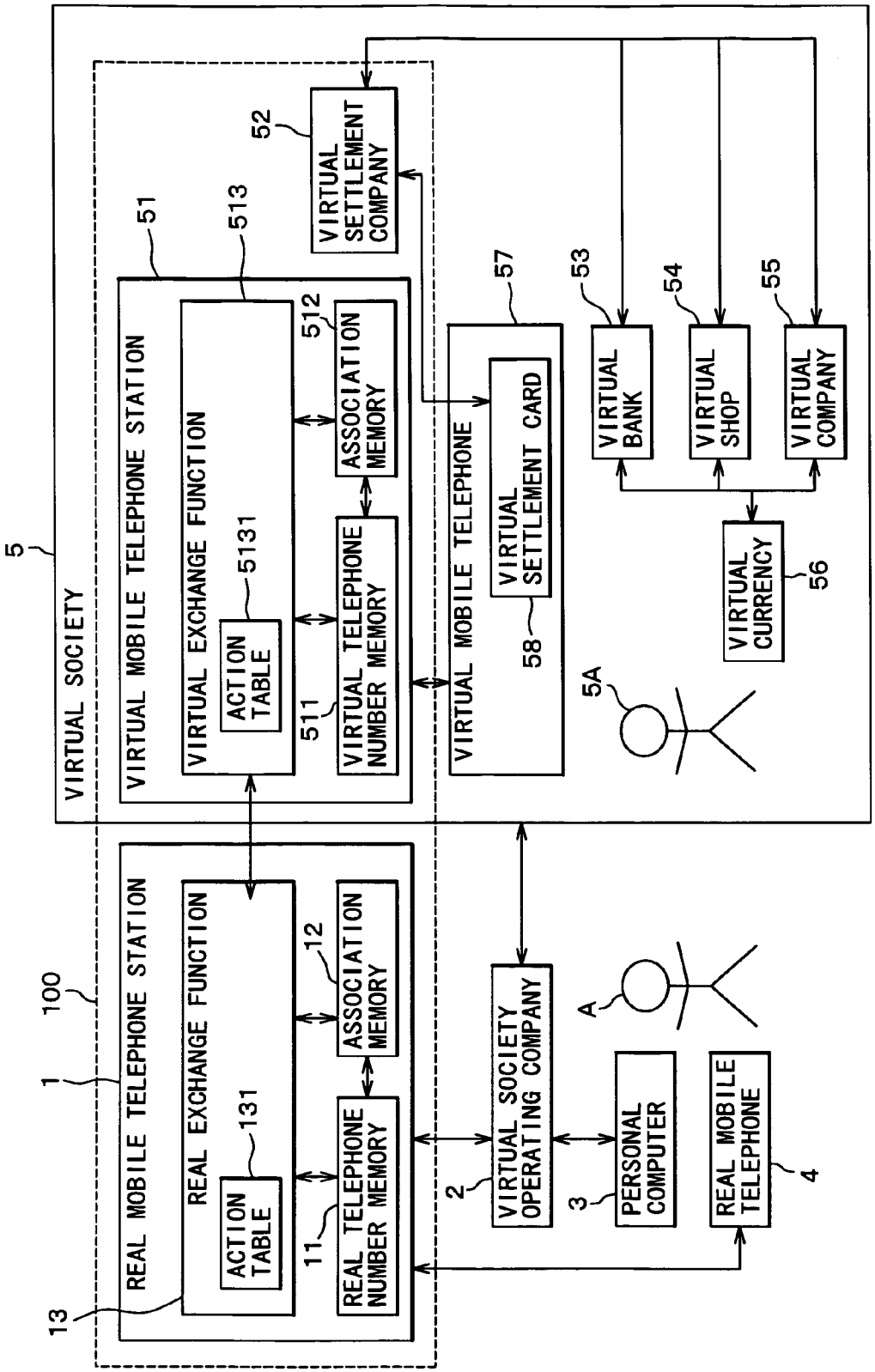
FIG. 1 is a view depicting a configuration of a telephone company system according to one example of the present invention.

1 Real mobile telephone station
2 Virtual society operating company
3 Personal computer
4 Real mobile telephone
5 Virtual society
11 Real telephone number memory
12 Association memory
13 Real exchange function
51 Virtual mobile telephone station
52 Virtual settlement company
57 Virtual mobile telephone
58 Virtual settlement card
511 Virtual telephone number memory
512 Association memory
513 Virtual exchange function

DESCRIPTION OF EMBODIMENTS

Hereinafter, a best mode for carrying out the present invention will be described in detail with reference to the accompanying drawings.

Example 1

FIG. 1 is a view depicting a structure of a telephone company system 100 according to one example of the present invention. The telephone company system 100 according to the present example is composed of a real mobile telephone station 1, a virtual mobile telephone station 51, and a virtual settlement company 52. The real mobile telephone station 1 is composed of a real telephone number memory 11, an association memory 12, and a real exchange function 13. The real exchange function 13 includes an action table 131, and performs telephone exchange of a real mobile telephone 4 in a real society. The virtual mobile telephone station 51 is composed of a virtual telephone number memory 511, an association memory 512, and a virtual exchange function 513. The virtual exchange function 513 has an action table 5131, and performs telephone exchange of a virtual mobile telephone 57 in a virtual society. A real telephone number RTA is assigned to the real mobile telephone 4 owned by a person A in the real society by the real mobile telephone station 1, and as a result of the real telephone number RTA being stored in the real telephone number memory 11 assigned to the real mobile telephone 4, the person A can make a telephone call via the real exchange function 13. The association memories 12, 512 will be described later.

A virtual society operating company 2 builds a virtual society 5 within it's own server. The person A can access the virtual society 5 via an Internet connection from a personal computer 3 to make a virtual person 5A corresponding to the person A in the virtual society 5 act within the virtual society 5. The virtual person 5A performs virtual economic activities such as opening an account with a virtual settlement company 52 or a virtual bank 53 in the virtual society 5, shopping at a virtual shop 54, and managing a virtual company 55.

A virtual telephone number VTA is assigned to the virtual mobile telephone 57 owned by the virtual person 5A by the virtual mobile telephone station 51, and as a result of the virtual telephone number VTA being stored in the virtual telephone number memory 511 assigned to the virtual mobile telephone 57, the virtual person 5A can make a telephone call to the virtual settlement company 52, the virtual bank 53, the virtual shop 54, the virtual company 55, unillustrated other virtual persons, other virtual shops, virtual companies, and the like within the virtual society 5 via the virtual exchange function 513.

A virtual currency 56 provided by the virtual society operating company 2 to the virtual person 5A is used for the economic activities mentioned above. For example, provided every month is a fixed amount of money according to a monthly charge for using the virtual society 5 to be paid by the person A, and provided is a prescribed amount of the virtual currency 56 as a bonus in each occurrence of the virtual person 5A behaving in an exemplarily manner in the virtual society 5. The virtual person 5A can shop at the virtual shop 54, manage the virtual company 55, or deposit money in the virtual bank 53 using the virtual currency 56.

Because the amount of the virtual currency 56 to be provided in the above is small particularly when the virtual person 5A first appears in the virtual society 5, the virtual economic activities by the virtual person 5A cannot but be limited to activities of small amounts such as conversations with unillustrated other virtual persons, participation in free virtual events, and shopping at the virtual shop 54, and it is thus difficult to spend freely on shopping and expand the management of the virtual society 55.

The virtual person 5A can use a virtual settlement card 58 issued by the virtual settlement company 52 to obtain a necessary amount of money. The virtual settlement card 58 is issued by associating the virtual telephone number VTA assigned to the virtual mobile telephone 57 with the real telephone number RTA assigned to the real mobile telephone 4 in the real world. The virtual settlement card 58 is, for example, an electronic money card, a debit card, or a credit card.

FIG. 2 is a flowchart explaining association of the real telephone number RTA and the virtual telephone number VTA and a procedure for issuing a virtual settlement card. The person A, by way of the Internet by the personal computer 3, or by way of the real mobile telephone station 1 via an Internet connecting unit of the real mobile telephone 4, connects to a virtual society operating company to initiate an application. Devices for an Internet connection other than these include digital televisions, PDAs (Personal Digital Assistants), and video games, and any of these may be used.

An application accepting step S1 confirms that the person A is a client of the virtual society 5, refers to memory content of the real telephone number memory 11 and the virtual telephone number memory 511 to confirm that the person A possesses the real mobile telephone 4 assigned with the real telephone number RTA by the real mobile telephone station 1 and that the virtual person 5A corresponding to the person A possesses the virtual mobile telephone 57 assigned with the virtual telephone number VTA by the virtual mobile telephone station 51 in the virtual society 5, and then accepts the application.

An examining step S2 confirms that the person A agrees with the following conditions (1) to (3).
(1) The real telephone number RTA and the virtual telephone number VTA are associated with each other.
(2) The virtual person 5A possesses the virtual settlement card 58 issued by the virtual settlement company 52 and uses the same for economic activities in the virtual society 5.
(3) The person A in the real world pays, as a security for money that the virtual person 5A spends by use of the virtual settlement card 58, a predetermined amount of money according to a charge by the real mobile telephone station 1. Here, the predetermined amount of money equals the amount of money spent with the virtual settlement card 58 which is multiplied by a predetermined exchange rate between the monetary value in the real world and the monetary value of the virtual currency 56 and to which a predetermined commission is added according to necessity.

An acceptance determination step S3 selects YES when the person A has agreed with all of the conditions (1) to (3) in the examining step S2, and stores this fact in the association memories 12, 512 by a telephone number associating step S5.

A virtual settlement card issuing step S6 issues the virtual settlement card 58 inside the virtual mobile telephone 57 by the virtual settlement company 52.

A acceptance answering step S7 notifies the person A that the above-mentioned procedure has succeeded and ends the entire procedure of FIG. 2.

In the procedure shown in FIG. 2, when the person A agrees with only the condition (1), only association between the real telephone number RTA and the virtual telephone number VTA is performed, and the virtual settlement card 58 is not issued. When the person A agrees with all of the conditions (1) to (3), association between the real telephone number RTA and the virtual telephone number VTA is performed, and the virtual settlement card 58 is issued. When the person A does not agree with the condition (1), the acceptance determination step S3 selects acceptance NO, and the procedure shown in FIG. 2 is ended by a rejection answering step S4.

FIG. 3 and FIG. 4 are examples of an action table included in a real exchange function, a virtual exchange function. First, explanation will be given by use of FIG. 3 of a case where the real telephone number RTA assigned to the real mobile telephone 4 and the virtual telephone number VTA assigned to the virtual mobile telephone 57 are unique numbers different from each other. FIG. 3 is a view explaining the contents of the action table 131, 5131 included in the real exchange function 13, the virtual exchange function 513, which depicts an example where the person A or the virtual person 5A makes a telephone call to an unillustrated person B or virtual person 5B corresponding to him/her. Stored in the action table 131, 5131 are the contents of FIG. 3 in their entirety, or only in part necessary for each table such as, for example, case numbers 201 to 203 in the action table 131, and case numbers 204 to 206 in the action table 5131. It is assumed that the person B owns a real telephone number RTB assigned from the real mobile telephone station 1 and the virtual person 5B owns a virtual telephone number VTB assigned from the virtual mobile telephone station 51.

In FIG. 3, the case number 201 is a case where the person A makes a telephone call to the person B, and the real exchange function 13 detects an operation of the person A being a caller calling at the real telephone number RTB, and calls up the real telephone number RTB.

The case number 202 is a case where the person A makes a telephone call to the virtual person 5B, and the real exchange function 13 detects an operation of the person A being a caller calling at the virtual telephone number VTB, and calls up the virtual telephone number VTB via the virtual exchange function 513 of the virtual mobile telephone station 51.

The case number 203 is a case where the person A makes a telephone call to both the person B and the virtual person 5B simultaneously, and the real exchange function 13 detects an operation of the person A being a caller calling at the real telephone number RTB and calls up the real telephone number RTB, and refers to memory content of the association memories 12, 512 to thereby detect that the real telephone number RTB is associated with the virtual telephone number VTB, and calls up the virtual telephone number VTB via the virtual exchange function 513 of the virtual mobile telephone station 51. The real exchange function 13 and the virtual exchange function 513 monitor call-accepted responses at the real telephone number RTB and the virtual telephone number VTB, connect to one that has responded to a call more quickly, and stop a call to the other.

In the above explanation, because the operation in the case number 203 of the person A being a caller calling at the real telephone number RTB is completely identical to the operation in the case number 201 of the person A being a caller calling at the real telephone number RTB, the real exchange function 13 cannot distinguish whether the operation is of the case number 201 or of the case number 203. Therefore, the person B selectively sets and stores in advance by an unillustrated unit in the association memories 12, 512 one of (a) always taking the case number 203 while disregarding the case number 201 and (b) always taking the case number 201 while disregarding the case number 203 as a processing operation of the real exchange function 13 when having detected an operation of the person A calling at the real telephone number RTB, and the real exchange function 13 is made to perform a processing operation in accordance with the memory content. When either the real telephone number RTB or the virtual telephone number VTB is busy, the real exchange function 13 answers the real mobile telephone 4 with a busy reply (a signal indicating that the other end telephone is busy).

The case number 204 is a case where the virtual person 5A makes a telephone call to the person B, and the virtual exchange function 513 detects an operation of the virtual person 5A being a caller calling at the real telephone number RTB, and calls up the real telephone number RTB via the real exchange function 13 of the real mobile telephone station 1.

The case number 205 is a case where the virtual person 5A makes a telephone call to the virtual person 5B, and the virtual exchange function 513 detects an operation of the virtual person 5A being a caller calling at the virtual telephone number VTB, and calls up the virtual telephone number VTB.

The case number 206 is a case where the virtual person 5A makes a telephone call to both the person B and the virtual person 5B simultaneously, and the virtual exchange function 513 detects an operation of the virtual person 5A being a caller calling at the real telephone number RTB, calls up the real telephone number RTB via the real exchange function 13, and refers to memory content of the association memories 12, 512 to thereby detect that the real telephone number RTB is associated with the virtual telephone number VTB, and calls up the virtual telephone number VTB. The real exchange function 13 and the virtual exchange function 513 connect to one that has responded to a call more quickly of call-accepted responses at the virtual telephone number VTB and the real telephone number RTB, and stop a call to the other.

In the above explanation, because the operation in this case number 206 of the virtual person 5A being a caller calling at the real telephone number RTB is completely identical to the operation in the case number 204 of the virtual person 5A being a caller calling at the real telephone number RTB, the virtual exchange function 513 cannot distinguish whether the operation is of the case number 204 or of the case number 206. Therefore, the person B or the virtual person 5B sets and stores in advance by an unillustrated unit in the association memories 12, 512 one of (c) always taking the case number 206 while disregarding the case number 204 and (d) always taking the case number 204 while disregarding the case number 206 as a processing operation of the virtual exchange function 513 when having detected an operation of the virtual person 5A calling at the real telephone number RTB, and the virtual exchange function 513 is made to perform processing in accordance with the memory content. When either the real telephone number RTB or the virtual telephone number VTB is busy in the operation of the virtual person 5A calling at the real telephone number RTB, the virtual exchange function 513 answers the virtual mobile telephone 57 with a busy reply.

As mentioned above, associating a real telephone number with a virtual telephone number allows making a telephone call to both the real society and virtual society without performing a special operation such as changing telephones in each case and using the virtual settlement card 58 issued by the virtual settlement company 52 to obtain a necessary amount of money, and thus this enables performing richer and smoother economic activities in the virtual society 5.

Next, explanation will be given of a case where the real telephone number RTA assigned to the real mobile telephone 4 is assigned also to the virtual mobile telephone 57 to provide the virtual telephone number VTA with identical numbers to those of the real telephone number RTA by use of FIG. 4. FIG. 4 is a view explaining the contents of the action table 131, 5131 included in the real exchange function 13, the virtual exchange function 513, which depicts a case where the person A or the virtual person 5A makes a telephone call to an unillustrated person B or virtual person 5B corresponding to him/her. In this case, because the memory content of the real telephone number memory 11 and the memory content of the virtual telephone number memory 511 result in an identical number in terms of an identical owner, the exchange function 13, 513 performs telephone exchange in accordance with the action table 131, 5131 shown in FIG. 4.

In FIG. 4, a case number 301 is a case where the person A makes a telephone call to the person B, and the real exchange function 13 detects an operation of the person A being a caller calling at the real telephone number RTB, and calls up the real telephone number RTB.

A case number 302 is a case where the person A makes a telephone call to the virtual person 5B. In this case, because the virtual telephone number VTB and the real telephone number RTB are identical, the person A performs an operation of dialing the real telephone number RTB prefixed with numeric characters P1 so that the real exchange function 13 can distinguish the case number 302 from the case number 301. In response to the operation shown as "calling at numeric characters P1+number RTB" in FIG. 4, the real exchange function 13 calls up the virtual telephone number VTB via the virtual exchange function 513.

A case number 303 is a case where the person A makes a telephone call to both the person B and the virtual person 5B simultaneously, and the real exchange function 13 detects an operation of the person A being a caller calling at the real telephone number RTB and calls up the real telephone number RTB, and refers to memory content of the association memories 12, 512 to thereby detect that the real telephone number RTB is associated with the virtual telephone number VTB, and calls up the virtual telephone number VTB via the virtual exchange function 513 of the virtual mobile telephone station 51. The real exchange function 13 and the virtual exchange function 513 monitor call-accepted responses at the real telephone number RTB and the virtual telephone number VTB, connect to one that has responded to a call more quickly, and stop a call to the other.

In the above explanation, because an operation in the case number 303 of the person A being a caller calling at the real telephone number RTB is completely identical to an operation in the case number 301 of the person A being a caller calling at the real telephone number RTB, the real exchange function 13 cannot distinguish whether the operation is of the case number 301 or of the case number 303. Therefore, the person B selectively sets and stores in advance by an unillustrated unit in the association memories 12 and 512 one of (e) always taking the case number 303 while disregarding the case number 301 and (f) always taking the case number 301 while disregarding the case number 303 as a processing operation of the real exchange function 13 when having detected an operation of the person A calling at the real telephone number RTB, and the real exchange function 13 is made to perform a processing operation in accordance with the memory content. When either the real telephone number RTB or the virtual telephone number VTB is busy, the real exchange function 13 answers the real mobile telephone 4 with a busy reply.

A case number 304 is a case where the virtual person 5A makes a telephone call to the person B. In this case, because the virtual telephone number VTB and the real telephone number RTB are identical, the person A performs a dialing operation by prefixing numeric characters P2 indicating that the other person to be called up exists in the real society to the real telephone number RTB so that the virtual exchange function 513 can distinguish the case number 304 from a case number 305 to be described later. In response to the operation shown as "calling at numeric characters P2+number RTB" in FIG. 4, the virtual exchange function 513 calls up the real telephone number RTB via the real exchange function 13.

The case number 305 is a case where the virtual person 5A makes a telephone call to the virtual person 5B, and the virtual exchange function 513 detects an operation of the virtual person 5A being a caller calling at the virtual telephone number VTB, and calls up the virtual telephone number VTB. Because the virtual telephone number VTB and the real telephone number RTB are the same, the caller's operation is shown in FIG. 4 as "calling at the real telephone number RTB" in consideration of the operator's convenience.

The case number 306 is a case where the virtual person 5A makes a telephone call to both the person B and the virtual person 5B simultaneously, and the virtual exchange function 513 detects an operation of the virtual person 5A being a caller calling at the virtual telephone number VTB, calls up the virtual telephone number VTB via the virtual exchange function 513 of the virtual mobile telephone station 51, and refers to memory content of the telephone number association memory 512 because the numeric characters P2 indicating that the other person to be called up exists in the real society have been prefixed to the virtual telephone number VTB by a caller's operation to detect that the real telephone number RTB is associated with the virtual telephone number VTB, and calls up the real telephone number RTB via the real exchange function 13. The real exchange function 13 and the virtual exchange function 513 connect to one that has responded to a call more quickly of call-accepted responses at the virtual telephone number VTB and the real telephone number RTB, and stop a call to the other.

In the above explanation, because the operation in this case number 306 of the virtual person 5A being a caller calling at the virtual telephone number VTB/calling at numeric characters P2+real telephone number RTB is completely identical to the operation in the case number 304 of the virtual person 5A being a caller calling at the real telephone number RTB, the virtual exchange function 513 cannot distinguish whether the operation is of the case number 304 or of the case number 306. Therefore, the person B or the virtual person 5B sets and stores in advance by an unillustrated unit in the association memories 12, 512 one of (g) always taking the case number 306 while disregarding the case number 304 and (h) always taking the case number 304 while disregarding the case number 306 as a processing operation of the virtual exchange function 513 when having detected an operation of the virtual person 5A calling at the real telephone number RTB, and the virtual exchange function 513 is made to perform processing in accordance with the memory content. When either the real telephone number RTB or the virtual telephone number VTB is busy in the operation of the virtual person 5A calling at the real telephone number RTB, the virtual exchange function 513 answers the virtual mobile telephone 57 with a busy reply.

As mentioned above, providing a real telephone number and a virtual telephone number as an identical number allows the virtual person 5A to make a telephone call to either of the real and virtual societies by dialing an identical number, without performing a complicated operation such as changing telephones in each case, with only a simple operation of prefixing the numeric characters P1, P2 according to necessity. This also allows using the virtual settlement card 58 issued by the virtual settlement company 52 to obtain a necessary amount of money, and thus enables performing richer and smoother economic activities in the virtual society 5.

However, the present invention is not limited to the above-described example.

In the explanation using the action table of FIG. 4, the numeric characters to be prefixed when making a telephone call from a real telephone to a virtual telephone are provided as P1, and the numeric characters to be prefixed when making a telephone call from a virtual telephone to a real telephone are provided as P2, however, the numeric characters P1 and the numeric characters P2 may be different or the same numerical values. In addition, when another virtual society exists on the Internet and making a telephone call to a telephone in the virtual society, the virtual society can be distinguished by prefixing thereto other numeric characters P3 for making a telephone call.

Although, in the above, the virtual society operating company 2, the personal computer 3, the real mobile telephone 4, the person A, the virtual person 5A, the virtual mobile telephone 57, the virtual bank 53, the virtual store 54, and the virtual society 55 are not a part of the present invention, these are shown in FIG. 1 for reasons of convenience in explanation.

All publications, patents, and patent applications cited in the present Specification are incorporated as they are as references in the present Specification.

The invention claimed is:
1. A telephone company system comprising:
(A) a real mobile telephone station including
  (a) a real telephone number memory for storing a telephone number assigned to a real mobile telephone, and
  (b) a real exchange function for performing telephone exchange of the real mobile telephone whose telephone number has been stored in the real telephone number memory; and
(B) a virtual mobile telephone station including
  (a) a virtual telephone number memory for storing a virtual telephone number assigned to a virtual mobile telephone in a virtual society on the Internet,
  (b) an associating unit for associating memory content of the real telephone number memory and memory content of the virtual telephone number memory with each other, and
  (c) a virtual exchange function, using the real mobile telephone and the virtual mobile telephone associated with each other by the associating unit as one mobile telephone, for performing telephone exchange in cooperation with the real exchange function, using either or both of the mobile telephones as a target of call making or call receiving,
wherein the virtual mobile telephone includes a virtual settlement function, and the virtual telephone station includes a unit for making the virtual settlement function effective if memory content of the real telephone number memory and memory content of the virtual telephone number memory have been associated with each other by the associating unit.

2. A telephone company system comprising:
(A) a real mobile telephone station including
  (a) a real telephone number memory for storing a telephone number assigned to a real mobile telephone, and
  (b) a real exchange function for performing telephone exchange of the real mobile telephone whose telephone number has been stored in the real telephone number memory; and
(B) a virtual mobile telephone station including
  (a) a virtual telephone number memory for storing a virtual telephone number assigned to a virtual mobile telephone in a virtual society on the Internet,
  (b) an associating unit for assigning a telephone number identical to that of the real mobile telephone to the virtual mobile telephone, and
  (c) a virtual exchange function, using the real mobile telephone and the virtual mobile telephone assigned with an identical telephone number by the associating unit as one mobile telephone, for performing telephone exchange in cooperation with the real exchange function, using either or both of the mobile telephones as a target of call making or call receiving,
wherein the virtual mobile telephone includes a virtual settlement function, and the virtual telephone station includes a unit for making the virtual settlement function effective if a telephone number identical to a telephone number stored in the virtual telephone number memory has been stored in the real telephone number memory under the name of an identical person.

* * * * *